Sept. 12, 1967  R. S. ZEBARTH ETAL  3,340,696
METHOD FOR CHILLING POULTRY
Filed May 3, 1966  2 Sheets-Sheet 2
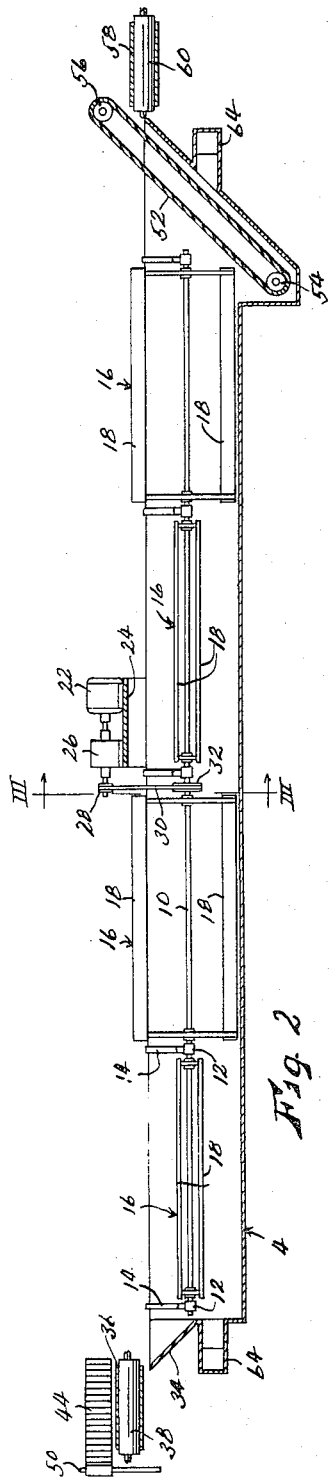
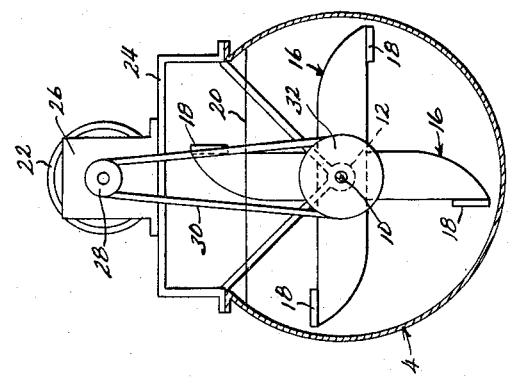
INVENTORS.
Ralph S. Zebarth
Drexel T. Carlson
BY John A. Hamilton
Attorney.

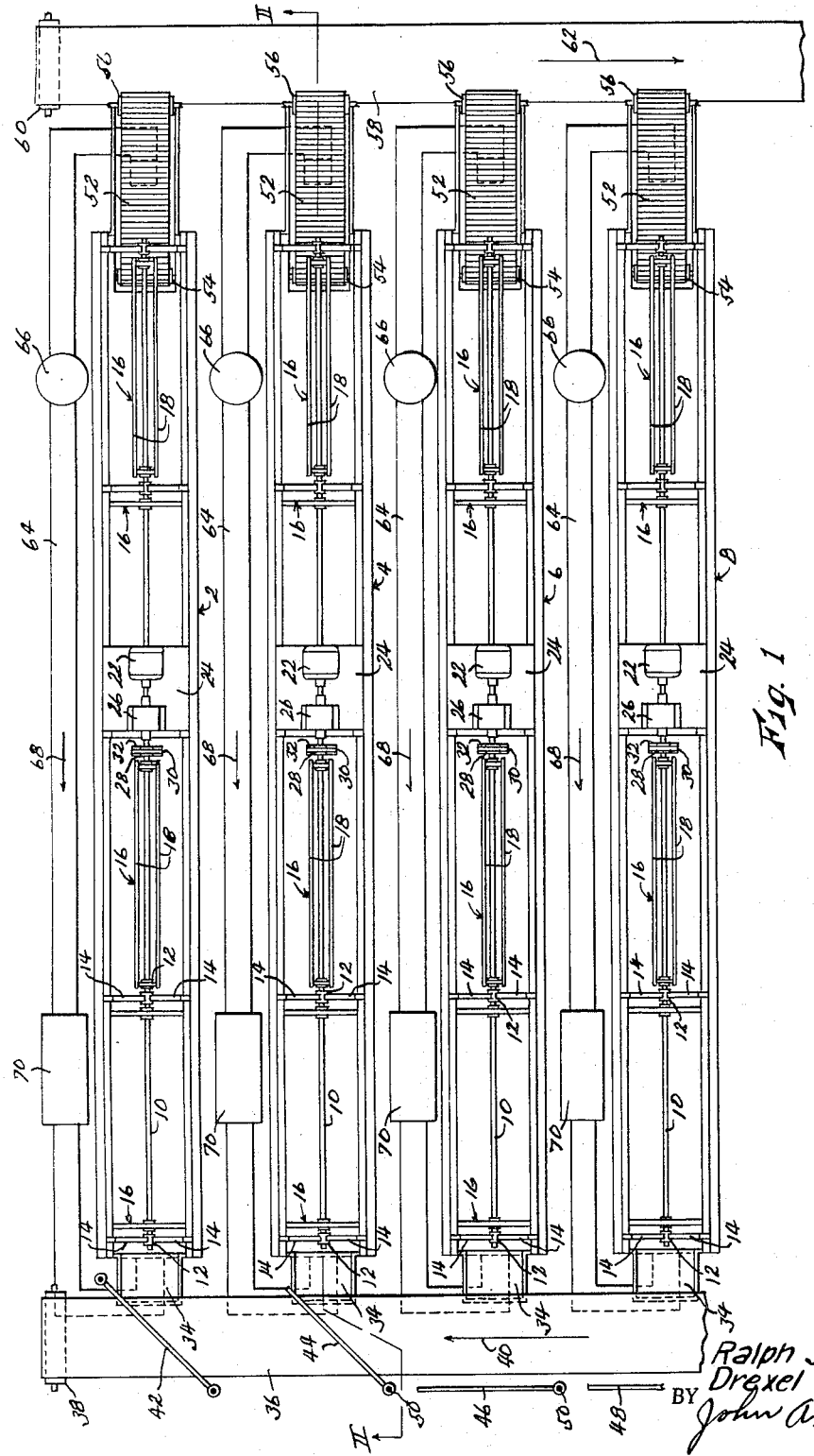

United States Patent Office 3,340,696
Patented Sept. 12, 1967

3,340,696
METHOD FOR CHILLING POULTRY
Ralph S. Zebarth, Kansas City, Mo., and Drexel T. Carlson, Leawood, Kans., assignors to Ralph Zebarth, Inc., Kansas City, Mo., a corporation of Missouri
Filed May 3, 1966, Ser. No. 547,356
2 Claims. (Cl. 62—63)

This invention relates to new and useful improvements in methods and apparatus for chilling poultry, and has particular reference to continuous chilling processes wherein poultry is continuously removed from the chilling apparatus at the same rate at which poultry is supplied thereto, in order to provide a straight-through, continuous flow of poultry as part of an overall poultry processing system.

In the usual poultry chilling apparatus, the carcasses, after plucking and evisceration, are fed into an elongated tank, or series of tanks, filled with a coolant liquid such as refrigerated or iced water, being propelled therethrough by water current and/or agitation, and removed at the opposite end of the tank. Each carcass must remain immersed in the tank for sufficient time to reduce the temperature thereof to the desired level, usually 40-45 degrees Fahr. Thus, in a given continuous system, the desired cooling could be provided by using a tank, or tanks, with sufficient length to insure retention of each carcass therein for the necessary time period.

However, difficulties have arisen in systems of this type due to restrictions imposed comparatively recently by the Department of Agriculture on the allowable moisture absorption by poultry during the chilling operation. For example, in the case of turkeys, the allowable moisture absorption is 4.5% for birds over 20 lbs. in weight, 6% for birds 10-20 lbs. in weight, and 8% for birds under 10 lbs. in weight, with similar restrictions for other poultry. Obviously, this creates a substantial problem, particularly with birds in the upper ranges of the various weight classes. For example, a 35 lb. turkey cannot be allowed to absorb any greater percentage of moisture than a 21 lb. turkey, despite the fact that due to its greater weight and bulk, it must remain in the chilling bath for a much longer time period to be thoroughly cooled to the required level. Similarly, a 19 lb. turkey must be cooled longer than a 10 lb. turkey, but is allowed only the same rate of moisture absorption.

Accordingly, the principal object of the present invention is the provision of a method and apparatus which overcomes these difficulties by substantially reducing the rate of moisture absorption by poultry carcasses of all weight classes during the chilling operation, and which at the same time permits continuous supply and removal of carcasses to and from the system at equal rates, as is desired in the overall processing system.

Our invention takes advantage of the fact that much of the absorption of water, the major portion of which is the result of entrapment of water in and under the skin, occurs due to the relatively violent agitation of the chilling bath which is necessary to insure the flow of the carcasses through the bath, the carcasses being slightly heavier than water and thus having a tendency to settle and lodge in the tank. Therefore, if the agitation could be halted or substantially reduced, as by rendering it only intermittent or of reduced intensity, the amount of water absorbed in a given time period would be greatly reduced. Moreover, such reduction of agitation does not materially decreases the efficiency of the cooling operation, the relatively violent agitation being necessary only for propulsion of the carcasses through the bath. Some agitation of the carcasses and some water current is still desirable, to prevent localized warming of the coolant by the heat of the carcasses, and to insure circulation of the coolant within the internal cavities of the carcasses, but this can be much less than the agitation and/or current required to propel the carcasses through the tank. Our invention thus entails said cessation or reduction of agitation.

However, such cessation or reduction is not permissible in the usual processing system using only a single tank or a plurality of tanks disposed in series, since the resulting cessation or interruption of the propulsion of the carcasses would cause intermittent or interrupted output of carcasses at the discharge end of the chiller, and such intermittent flow of carcasses is not permissible in a continuous overall processing system. Accordingly, a further provision of our invention is the use of a plurality of chilling tanks connected in parallel, with means for delivering and removing poultry selectively to and from any one of said tanks. Thus poultry may be fed into one tank, with full agitation and coolant flow to propel the carcasses therealong, until said tank is filled to capacity, and the input then switched to the second tank, while the agitation in the first tank is greatly reduced to inhibit water absorption by the carcasses. This process is repeated, each tank being charged successively, until all of the tanks are charged to capacity with poultry. Then full agitation may be restored to the first tank to resume propulsion of the poultry through the tank to its outlet end, where it is removed to a conveyor for further processing. The process is then continuous, poultry being added to one tank while simultaneously being removed from another. The optimum number of tanks required may easily be determined as will be described.

Other objects are simplicity and economy of construction, efficiency and dependability of operation, and adaptability and flexibility for use in varying circumstances.

With these objects in view, as well as other objects which will appear in the course of the specification, reference will be had to the accompanying drawing, wherein:

FIG. 1 is a top plan view, partially schematic in character, of a poultry chilling system involving the method and apparatus contemplated by our invention, FIG. 2 is a vertical sectional view, with parts broken away and parts left in elevation, taken through one of the chilling tanks on line II—II of FIG. 1, and FIG. 3 is an enlarged sectional view taken on line III—III of FIG. 2.

Like reference numerals apply to similar parts throughout the several views, and the numerals 2, 4, 6 and 8 apply respectively to each of a plurality of chilling tanks. Each of said tanks is horizontally disposed and is elongated, being of generally circular cross-sectional contour as shown in FIG. 3. Extending axially in each tank is a shaft 10 journalled in bearings 12 suspended in said tank at intervals therealong by hanger members 14, said shaft extending substantially the full length of the tank. Affixed on said shaft so as to be rotatable therewith are a series of agitator reels 16 each including a plurality of vanes 18 which extend parallel to the tank axis, and which move in close proximity to the interior wall of the tank as the reels are rotated. Each tank is normally filled with a liquid coolant such as refrigerated water approximately to the level indicated at 20 in FIG. 3. The reel shaft 10 is rotated, usually at about four revolutions per minute, by an electric motor 22 mounted on a bracket 24 at the top of the tank. Said motor is connected, through a speed reducer also mounted on bracket 24, to a pulley 28, which is in turn operably connected by a flexible belt 30 or the like to a pulley 32 fixed on reel shaft 10. It will be understood that the motors 22 for each of the tanks is operable independently from the others.

The tanks 2, 4, 6 and 8 are preferably disposed in parallel, coextensive relation, as shown in FIG. 1. Each tank is provided at its inlet end with an inclined feeder chute 34. Poultry carcasses are fed to the tanks by a horizontal conveyor belt 36, shown in part, which is trained over a rotatable drum 38, and the upper reach of which travels transversely to the tanks in the direction of arrow 40, overlying the feeder chute 34 of each tank. A fixed deflector wall 42 extends obliquely across the upper reach of belt 36 in alignment with tank 2, whereby any carcasses moved against said wall by the belt are deflected from said belt into the feeder chute 34 of tank 2. Tanks 4, 6 and 8 are equipped respectively with deflector gates 44, 46 and 48, as best shown in FIG. 1, each of said gates being pivoted on a vertical axis adjacent the edge of belt 36, as at 50, for movement either to a position not overlying the belt (gates 46 and 48 in FIG. 1) or to a position obliquely overlying said belt (gate 44 in FIG. 1) whereby to deflect poultry on the belt into the feeder chute 34 of the associated tank. FIG. 1 shows the gates set to deliver poultry to tank 4, but obviously they could be set so as to deliver poultry to any one of the tanks. The gates could be moved by any suitable means, not shown, either manually or by powered means.

Poultry is removed from the outlet end of each of the tanks by means of an inclined belt conveyor 52 trained at its lower end about a drum 54 rotatably mounted in the tank below the level of reels 16, and trained at its upper end about a drum 56 disposed externally of the tank, either or both of said drums being driven by suitable power means, not shown, though it will be understood that each conveyor 52 is operable independently of the others. The upper ends of all of conveyors 52 are disposed above the upper reach of a horizontal conveyor belt 58, said last named conveyor belt being trained over a rotatable drum 60 and moving in the direction of arrow 62. Each of the tanks also has a conduit 64 external thereto, being adapted to remove water from the outlet end thereof, adjacent discharged conveyor 52, and to return it to the tank at the inlet end thereof, adjacent feeder chute 34. A pump 66 in each of said conduits forces water therethrough in the direction of the arrow 68, whereby to cause a flow of water in the associated tank from the inlet end to the outlet end thereof. Additionally, each conduit 64 may direct water flowing water therethrough through a refrigeration system indicated generally at 70, in order to remove the body heat absorbed by the water in each passage thereof through the associated tank. Alternatively, the water in the tanks may be refrigerated by crushed ice or the like simply dumped into the tanks from the tops thereof.

The chilling system shown is intended as a portion of an overall processing system, the poultry being delivered to the chiller by belt 36 from such preliminary process steps as killing, plucking and evisceration, and delivered from the chiller by belt 58 to such subsequent process steps as dismembering, freezing and packaging. It will be readily apparent that in such an overall system, it is necessary or at least highly desirable that a continuous, unbroken flow of poultry be maintained at all times.

Chilling systems including a single one of the tanks as here shown, together with its agitation and water circulation systems, are already in use, but give rise to certain problems relating to moisture absorption by the poultry carcasses, as already discused. For example, a 19 lb. turkey cannot be allow to absorb any greater percentage of moisture (6%) than a 10 lb. turkey, but due its added weight and bulk, requires considerably longer to be cooled adequately. By the same token, in such a single-tank system, or a system with a plurality of tanks connected in series, all of the carcasses inherently remain in the tank or tanks for the same length of time. Therefore, even if the immerison time (as reflected by the tank length) is balanced as carefully as possible against the average weight of the carcasses to be chilled, the single-tank system inevitably has the undesirable outcome either that some of the heavier carcasses will be inadequately cooled, or that some of the lighter carcasses will absorb too much moisture, or both.

It has been found that within certain limits, the efficiency of the heat transfer is not appreciably reduced by reducing the degree of agitation of the water in the tanks by reels 16, or by reducing the water current induced therein by pumps 66. On the contrary, it has been found that once each tank has been charged to capacity with carcasses, only relatively slight water current and agitation is required to maintain virtually full efficiency of the heat transfer operation, a slight current to maintain a fresh supply of cold water, and a slight or intermittent agitation to prevent the carcasses from settling into a mass at the bottom of the tank, so that water could not reach the interior of the mass, and to insure circulation of the water in the interior cavities of the carcasses, being fully adequate. Moreover, such reduction of current and agitation, while not appreciably or seriously reducing the efficiency of heat transfer, does substantially reduce the amount of moisture absorbed by the carcass during the procedure. The feather-removing step of poultry processing often loosens the skin, forming pockets between the skin and the flesh, and moisture absorbed in the skin and in these pockets, the amount of moisture so taken on being greatly increased by severe or continued agitation. If the degree of agitation could be substantially reduced, though still continuing enough agitation to maintain efficient heat transfer, the amount of moisture absorbed by a carcass in a given time period could be greatly reduced.

However, the principle of reducing the water current and/or agitation in the tank cannot be applied to a single-tank system, or a system with tanks in series, as described above, since to do so would interrupt or halt the flow of carcasses through the tank, causing only intermittent supply of chilled carcasses to the discharge conveyor 58. As explained above, this is not permissible in a straight-through, continuous poultry processing system. Full agitation and current, of a much higher order than is necessary to produce efficient heat transfer, is necessary to cause the carcasses to flow evenly through the tank. The current supplies the actual propulsion force, and the agitation keeps the carcasses in full suspension in the water so that they can be propelled by the current. The carcasses have a specific gravity slightly greater than unity, so that they will sink, though slowly, and therefore tend to mass at the bottom of the tank, unless agitated at least slightly. However, operating the agitating reels perhaps one minute in ten is adequate to maintain adequate efficiency of the chilling operation.

In the present method and apparatus, the poultry is first fed into one tank, say tank 2, by conveyor belt 36, deflector wall 42, and feeder chute 34. This feed is continued with agitator reels 16 and pump 66 of that tank in full operation, but with the discharge conveyor 52 of that tank not in operation, until the tank is fully charged with poultry carcasses. Then deflector gate 44 is set to deliver carcasses to tank 4, and simultaneously the agitator reels 16 of tank 2 are set to operate at a much slower rate of speed, or to operate only intermittently, or pump 66 of tank 2 is set to pump water at a slower rate, or both. The process is repeated, reducing the current and/or agitation in each tank after it is charged to capacity with poultry, until all of the tanks are fully charged. Then discharge conveyor 52 of the first tank charged (tank 2 as described) is set in operation, while simultaneously setting pump 66 and the agitator reels 16 of that tank in constant full operation to insure propulsion of the carcasses through the tank to the discharge conveyor. At the same time, the deflector wall 42 may again be brought into use to direct the supply of new carcasses to the entry end of tank 2. There will normally be very little intermixture of the already-chilled carcasses with the freshly-added carcasses, even though said carcasses are simultaneously removed from and added to the same tank, though some care must be exercised to shut off discharge conveyor 52 when the chilled carcasses have been removed but before the newly-added carcasses reach said conveyor. To avoid this problem, there may be inserted one more tank than would otherwise be required, so that carcasses can be removed from one tank while simultaneously being added to another, whereby there would be no possibility of intermixture of the chilled carcasses with the newly added carcasses.

The number of tanks required may be determined by dividing the maximum chilling time which may be required for carcasses of the weight being processed by the time required to fill or empty one tank when under full agitation and maximum current. For example, if the maximum chilling time required is two hours, and it requires thirty minutes to charge each tank with carcasses, four tanks as shown are required. Then each carcass remains in the coolant bath for the full two hours, but is subjected to full current and agitation for only thirty minutes, being subjected only to the reduced current and/or agitation for the other ninety minutes. This reduction of agitation during the major portion of the chilling period has been found to hold the moisture absorption well within allowable limits even for carcasses in the upper limits of each weight category. Also, as the carcasses are added continuously to one tank or the other, and simultaneously removed either from the same or another tank, a continuous, uninterrupted flow of carcasses is maintained at all times, so as not to interfere with smooth operation of the overall processing system.

The above formula for determining the number of tanks needed is exemplary only, and is subject to variation, for various reasons. For example, with the figures quoted in the above example of the formula, it may be desired, as mentioned, to insert a fifth tank so that it is never necessary to feed fresh carcasses into the same tank from which chilled carcasses are simultaneously being discharged, so that intermixture of the fresh and chilled carcasses cannot occur. Also, the ratio of 3 to 1 of the reduced agitation time to the full agitation time could be further increased by using a larger number of shorter tanks. For example, by using eight tanks each short enough that a carcass will travel therethrough in fifteen minutes with full agitation, the ratio could be increased to 7 to 1.

The precise method of reducing the agitation in the tanks at the appropriate times is of course subject to variation. It can be done by reducing the water current in the tank produced by pump 66, as by reducing the pump speed, although some current is of course necessary to carry away the water heated by contact with the carcasses. It can also be done either by reducing the rotational speed of the agitator reels 16, or by operating said reels at full speed but only intermittently. As presently tested all of these methods, or combinations thereof, have been found operable, but the method most fully tested, and found fully acceptable, is to operate pumps 66 at the same speed at all times, and to operate the agitator reels at full speed, but only intermittently, to provide the reduced agitation at the appropriate times, for example, to operate the reels only one minute in each ten. Full current in the water has been found to provide less reduction in the efficiency of the heat transfer process than occurs with reduced current and relatively greater agitation. Also, controls providing intermittent operation of reel motors 22 are much more economical than controls, such as variable speed motors or variable power transmissions, required to provide low-speed reel operation. Furthermore, since the carcasses so nearly float in the bath and sink so slowly in the absence of agitation, intermittent agitation has been found fully as effective as reduced or low-speed agitation in preserving water flow between and within the carcasses.

Finally, it will be seen that while the means for controlling deflector gates 44, 46 and 48, reel motors 22, pumps 66 and discharge conveyors 52 can be manually operable, as for example by manually operable electric switches, nevertheless the system is well adapted for automatic operation, it being possible to program all of these controls in a timed sequence so that the tanks are charged and emptied in the proper order without attention from any human operator. Also, the system is flexible, in that only as much of it as is actually needed may be used in any set of circumstances. For example, if lighter-weight poultry is being processed, which requires only one hour of immersion time instead of the two hours in the previous example, then only two of the tanks need be charged, refrigerated, etc. This makes possible a substantially economic saving.

While we have described and set forth specific forms and applications of our method, and have shown and described a specific embodiment of an apparatus adapted to perform our method, it will be readily apparent that many minor changes or modifications of both method and apparatus could be made without departing from the spirit of the invention as defined by the scope of the appended claims.

What we claim as new and desire to protect by Letters Patent is:

1. In a continuous poultry processing system a method of chilling poultry carcasses comprising:
   (a) adding poultry carcasses from a continuous supply of said carcasses selectively into any one of a plurality of liquid chilling baths whereby said baths are successively charged to capacity with said carcasses,
   (b) removing all of said carcasses from each of said baths in succession, in the same order in which they were previously charged,
   (c) maintaining the liquid of each of said baths in relatively severe agitation as carcasses are added thereto or removed therefrom, whereby to assist in moving said carcasses into and through said bath, and
   (d) maintaining the liquid of each bath in relatively mild agitation during the time periods in which carcasses are neither being added to or removed therefrom.

2. In a continuous poultry processing system, a method of chilling poultry carcasses comprising:
   (a) adding poultry carcasses from a continuous supply of said carcasses successively into a plurality of liquid chilling baths, said baths each being completely charged before carcasses are added to the next bath, each bath having an inlet station at which said carcasses are added and a distal outlet station,
   (b) creating a current in the liquid of each of said baths flowing from the inlet station to the outlet station thereof,
   (c) subjecting the liquid of each bath to relatively severe agitation during the period carcasses are being added thereto, whereby to assist said current in moving carcasses through said bath,
   (d) subjecting the liquid of each bath to relatively mild agitation after it has been fully charged with carcasses,
   (e) removing all of the carcasses from each of said baths in succession, in the same order they were previously charged, and
   (f) subjecting each bath to relatively severe agitation as carcasses are being removed therefrom, whereby to assist said current in moving carcasses to said outlet station.

References Cited
UNITED STATES PATENTS

| | | | |
|---|---|---|---|
| 3,022,646 | 2/1962 | Zebarth | 62—64 X |
| 3,097,501 | 7/1963 | Pappas | 62—64 X |
| 3,250,086 | 5/1966 | Morris | 62—64 X |

EDWARD J. MICHAEL, *Primary Examiner.*

ROBERT A. O'LEARY, *Examiner.*

W. E. WAYNER, *Assistant Examiner.*